Patented Dec. 7, 1948

2,455,595

UNITED STATES PATENT OFFICE 2,455,595

PROCESS OF MANUFACTURING POTASSIUM TETRABORATE AND SODIUM TETRABORATE

Frank Henderson May, Trona, Calif., assignor to American Potash & Chemical Corporation, Trona, Calif., a corporation of Delaware No Drawing. Application January 22, 1944, Serial No. 519,340

8 Claims. (Cl. 23—59)

This invention relates to a process of manufacturing potassium tetraborate, $K_2B_4O_7.4H_2O$ and incidentally sodium tetraborate, $Na_2B_4O_7.10H_2O$. Reference is made to the following patents and applications covering the same or related subject matter, which are copending with this application. They are as follows:

May Patent No. 2,374,876, issued on application No. 466,675, filed November 23, 1942; May Patent No. 2,374,877, issued on application No. 507,300, filed October 22, 1943; May Patent No. 2,395,564, issued on application No. 460,278; filed September 30, 1942; May Patent No. 2,395,565, issued on application No. 462,425, filed October 17, 1942; May Patent No. 2,395,566, issued on application No. 507,299, filed October 22, 1943; May and Suhr Patent No. 2,395,567, issued on application No. 558,263, filed October 11, 1944; and an application No. 507,298, filed October 22, 1943.

Heretofore potassium tetraborate has not been an article of commerce, due, largely, to the difficulty, and expense, of its manufacture. Laboratory quantities have been prepared by reacting potassium hydroxide with boric acid. Both of these are expensive chemicals. Likewise potassium tetraborate may be manufactured by reacting potassium hydroxide with potassium pentaborate, but such procedure only partially solves the practical question of economy.

The present invention produces potassium tetraborate by a reaction between potassium pentaborate (usually in the hydrated form $K_2B_{10}O_{16}.8H_2O$) and a cheap sodium alkali, such as sodium carbonate, bicarbonate, or hydroxide.

Potassium pentaborate reacts with sodium alkali to produce a mixture of potassium tetraborate and sodium tetraborate. Typical reaction between potassium pentaborate and sodium alkalis are best expressed in the following equations:

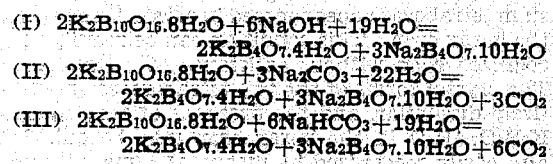

Equations II and III do not go to completion, but rather the mother liquors contain soluble carbonates which, under the conditions of the process as described herein, remain in solution and do not contaminate the product.

Equations II and III are carried out at high temperatures and at the high temperatures employed, the potassium tetraborate and sodium tetraborate formed, remain in solution. Likewise these compounds remain in solution if formed by Equation I, operated at high temperature. On cooling such solutions, both the potassium tetraborate $K_2B_4O_7.4H_2O$ and sodium tetraborate $Na_2B_4O_7.10H_2O$, tend to crystallize and precipitate from the solution, and if these materials are allowed to crystallize as a mixture, such a mixture is relatively worthless. I have discovered, however, that it is possible to conduct the crystallization of these compounds separately by recourse to supersaturation phenomena. By cooling under conditions favorable to maintain potassium tetraborate in its supersaturated state and for crystallizing sodium tetraborate, I have discovered that it is possible to crystallize a heavy crop of sodium tetraborate, after which it is possible to effect crystallization of the potassium tetraborate compound as a substantially pure product, uncontaminated by sodium tetraborate.

I will first submit examples of my process of the type expressed by Equation III. Potassium pentaborate and sodium bicarbonate are added to a cyclic mother liquor containing considerable carbonate or bicarbonate in solution, and the mixture is boiled to drive off $CO_2$ from the added ingredients, essentially as expressed by Equation III. The cyclic mother liquor may contain little combined $CO_2$ (carbonates or bicarbonates), or it may contain as much as 18 percent by weight of the liquor, when expressed as $KHCO_3$. I have found that combined $CO_2$ contents in the cyclic mother liquors at, say 35° C., ranging from 7 percent $KHCO_3$ to 18 percent $KHCO_3$ are entirely satisfactory for the operation of my process. The criterion of the limit of allowable combined $CO_2$ content is the ultimate solubility of sodium bicarbonate, $NaHCO_3$. If this value be exceeded, said solid phase will precipitate with the tetraborate crop. Though the process may be operated satisfactorily with cyclic mother liquors containing less than 7 percent combined $CO_2$ (expressed as $KHCO_3$) I have found it more difficult to conduct the reaction of Equation III (i. e., boil off the $CO_2$) when the mother liquors are less "acid"—i. e., contain less "$KHCO_3$." This reluctance is due to the presence of enormous quantities of the "basic" borates ($K_2B_4O_7$ and $Na_2B_4O_7$) in the hot solutions, as is indicated by Equation III, and as will be more specifically discussed.

The process being cyclic, I may begin a description of an example with a cold mother liquor from a previous batch. This liquor contained no suspended solids, was somewhat warmer than 35° C., and showed, by analysis 11.8 per cent $K_2O$, 3.5 per cent $Na_2O$ and 19.4 percent $B_2O_3$. Its $CO_2$ content, expressed as $KHCO_3$ was 12.0 percent. To 2305 pounds of this mother liquor, I added 590 pounds of potassium pentaborate, $K_2B_{10}O_{16}.8H_2O$, and 255 pounds of sodium bicarbonate, $NaHCO_3$. I also added 170 pounds of water which water may, if convenient or desired, consist of suitable wash waters from previous operations, or even entrained water (in part at least) carried by the added raw materials—for example, wet filter cakes. The raw material may be contaminated with borax, without harm to the present process, as one of the functions of the process is to produce and crystallize borax, prior to recovering a crop of $K_2B_4O_7.4H_2O$.

The weight of the raw materials, $K_2B_{10}O_{16}.8H_2O$ and $NaHCO_3$ is seen to be 845 pounds, and the $NaHCO_3$ content of the mixture is seen to be about 30 percent—the $K_2B_{10}O_{16}.8H_2O$ content 70 percent. Such a mixture may be produced by the process of my copending application, Serial No. 507,300, filed October 22, 1943, issued May 1, 1945, as United States Letters Patent No. 2,374,877; said prior process provides a very desirable source of raw material for the process of the present application. When employing a mixture of $K_2B_{10}O_{16}.8H_2O$ and $NaHCO_3$, such as that resulting from the operation of the process of my aforesaid copending application, it often happens that said mixture will not show, by analysis, solely $K_2B_{10}O_{16}.8H_2O$ and $NaHCO_3$. If said mixture has been washed for the displacement of impurities, or partially dried in handling, some of the $CO_2$ may have been lost (i. e., the reaction expressed by Equation III may have taken place, in part, at least), and the resulting raw material will therefore show (by analysis) some potassium tetraborate—or, it might be calculated to be a mixture of $K_2B_{10}O_{16}.8H_2O$ and $Na_2CO_3$ with or without some $NaHCO_3$. Except for the loss of the $CO_2$, which is a valuable commodity, such "decomposition" taking place in the raw material is of little consequence; but proper allowance must be made both in the matter of weights and in the amount of $CO_2$ to be subsequently boiled off.

The mixture of cyclic mother liquor, water and potassium pentaborate-sodium bicarbonate is next heated and boiled, to drive off carbon dioxide. In this example, the expulsion of about 135 pounds of $CO_2$ served to complete the reaction expressed by Equation III, insofar as the added solid ingredients are concerned. The heating and liberation of $CO_2$ results in a clear, syrupy liquor, which is next cooled as specified below.

The carbon dioxide liberated by the boiling operations may, to advantage, be used for the preparation of further quantities of the $$K_2B_{10}O_{16}.8H_2O-NaHCO_3$$

mixture by aforementioned process of my copending application. Or, such liberated $CO_2$ may be used for other purposes, as it is extremely pure. The boiling operation carries but little water off with the $CO_2$, and such water may be refluxed or condensed back into the cyclic batch, to keep said cycle in balance.

The hot solution is then subjected to cooling operations. Such cooling, if not conducted with regard to the procedure which I have discovered, and herewith disclose, would result in the precipitation of a mixture of potassium tetraborate, $K_2B_4O.4H_2O$ and sodium tetraborate, $$Na_2B_4O_7.10H_2O$$

Such a mixture is relatively worthless.

I have found that the tetraborates of potassium and of sodium possess quite similar solubility characteristics, and that attempts to separate them by usual or classical fractional crystallization procedures are unsatisfactory. Instead, I take recourse to supersaturation phenomena I have discovered. By this novel procedure I am able to bring about the crystallization of sodium tetraborate, $Na_2B_4O_7.10H_2O$ while holding the potassium tetraborate, $K_2B_4O_7.4H_2O$, in solution, in a state of high supersaturation, the while. After completing the crystallization of a crop of borax, I then induce crystallization of the highly supersaturated potassium tetraborate, and cause it to precipitate as a crop of commercially pure $K_2B_4O_7.4H_2O$.

The hot solution is placed in a suitable cooler, fitted with means for imparting mild agitation to the solution and also fitted with suitable heat transfer (cooling) means such as cooling coils or the like. Vacuum cooling may be employed after the hot solution has been cooled by indirect coolers to 50–60° C. and such a combination is quite satisfactory, as, at the intermediate temperature, the $CO_2$-partial pressure of the pregnant liquor has become negligible, and at the same time, it has not yet begun to deposit borate crystals. To bring about preferential crystallization of borax from the solution simultaneously supersaturated with respect to the two tetraborates, I conduct this first cooling step relatively quickly—say over a period of two hours, or so. Also, to encourage said selective borax crystallization, I add to the batch, at the low temperature, a pound or so of borax crystals, as "seed." While some agitation of the batch is desirable and necessary during the cooling operations, I try to avoid excessive, or violent, agitation.

By so cooling to 35° C. over a period of a couple of hours, I precipitated a crop of borax. This crop when centrifuged and given a light wash (which washings were kept separate from the liquor) was computed to contain about 575 pounds of $$Na_2B_4O_7.10H_2O$$

On a liquor-free basis, an analysis showed it to contain 98.5 percent $Na_2B_4O_7.10H_2O$, the major impurity being a little $K_2B_{10}O_{16}.8H_2O$. Such borax may be dried and sold as an article of commerce, or it may be utilized in the aforementioned process of my copending application, for the manufacture of a crop of $K_2B_{10}O_{16}.8H_2O-NaHCO_3$, by reacting it with $KCl$ and $CO_2$.

It will be noted that this crop of borax was essentially free of any admixture with solid-phase $K_2B_4O_7.4H_2O$, despite the fact that the solution from which it was crystallized was highly supersaturated at 35° C. with respect to said potassium salt. I have found that sometimes, such potassium tetraborate does succeed in crystallizing with the borax crop. This condition can be readily recognized even without assistance of an analyst. The crystal forms of the two tetraborates are entirely dissimilar, and the presence of very much $K_2B_4O_7.4H_2O$ in the borax crop may be quickly and easily recognized by means of a magnifying glass or a low-power microscope. When such potassium tetraborate crystallization does take place with the borax crop, (usually as the result of interruptions of operations—allowing the cold batch to stand too long before removing the borax) it can be easily cured, viz: The mixture is heated slightly—say to 45 or 55° C. until the offending $K_2B_4O_7.4H_2O$ crystals disappear; then the cooling is repeated, and a pure borax crop removed.

Liquor from the borax separation step was then caused to precipitate a crop of commercially pure potassium tetraborate, $K_2B_4O_7.4H_2O$. I accomplished this by adding some, say a pound, of $K_2B_4O_7.4H_2O$ crystals to the cold liquor. The seeded liquor was then agitated for a relatively long time, say 18 hours or more. At the end of such period, the temperature still being about 35° C., I proceeded to remove by centrifuging, a crop of potassium tetraborate. This crop was also washed. (The washings may be passed into the end liquor, to supply a portion of the water needed in the following cycle.) Weighing and computations showed the recovered crystal crop to contain about 300 pounds of $K_2B_4O_7.4H_2O$. Analysis showed the liquor-free solids to contain about 96.5 per cent $K_2B_4O_7.4H_2O$. The major impurities present as solid phases were about 1 percent each of $Na_2B_4O_7.10H_2O$ and $K_2B_{10}O_{16}.8H_2O$.

Part of borax contamination of the $$K_2B_4O_7.4H_2O$$

crop was possibly due to the minor "concentrating" effect induced by the abstraction of water (of crystallization) by the crystallizing $$K_2B_4O_7.4H_2O$$

Likewise, I have found that the first crystallization of borax often fails to go entirely to completion, leaving small supersaturation values (with respect to $Na_2B_4O_7.10H_2O$) in the liquor. If the small quantity of $Na_2B_4O_7.10H_2O$, so crystallizing with the $K_2B_4O_7.4H_2O$ crop, is undesirable, it may be circumvented in several ways. A small amount of water may be added to the liquor, after removing the borax crop—said small dilution being sufficient to satisfy the residual supersaturation values with respect to $Na_2B_4O_7.10H_2O$ and/or sufficient to compensate the water of crystallization of the crop of $K_2B_4O_7.4H_2O$ to be crystallized. Another method for preventing further, minor, borax crystallization with the $K_2B_4O_7.4H_2O$ crop is by conducting the $K_2B_4O_7.4H_2O$ crystallization at a slightly higher temperature than the $Na_2B_4O_7.10H_2O$ crystallization. Based upon my discovery that $Na_2B_4O_7.10H_2O$ also has a strong tendency toward supersaturation, especially at relatively low supersaturation concentrations, I am provided with a third method for circumventing said minor difficulty, when desired. By this method, I take the filtered or centrifuged liquor from the borax crop, heat it slightly (say to 40°-50° C.) to "destroy" any fine borax seed, and again cool it to the original low temperature (35° C. in the above example) or even lower. Under such conditions borax seems to be reluctant to again establish itself as a separate solid phase, which phase would act as a contaminant of the $K_2B_4O_7.4H_2O$ crop.

The product of the above example is satisfactory as a commercially pure product. However, it may be rendered even purer by simple recrystallization. Such recrystallization is highly efficient due (1), to the small quantities of impurities present, and, (2) to the fact that end liquors, or "bleed-off" from the recrystallization procedure may be added to the present cycle, either as wash waters or as make-up during the addition of the several reagents or raw materials. By such recrystallization, I have made many hundreds of pounds of $K_2B_4O_7.4H_2O$ of 99.5+ percent purity.

The mother liquor resulting from the separation of the commercial $K_2B_4O_7.4H_2O$ crop was essentially the same, both in weight and in composition, as that employed at the start of this example, and it may be used to conduct another cycle. Although it is cooled and agitated for many hours at 35° C., I find that it does not reach equilibrium even under such conditions. That is to say, it may contain $K_2B_{10}O_{16}.8H_2O$, $K_2B_4O_7.4H_2O$ and $Na_2B_4O_7.10H_2O$ in quantities considerably greater than would obtain were the agitation (with seeding) continued at 35° C. for several weeks.

It should also be understood that the liberation of $CO_2$ by virtue of the boiling operations was not complete. The hot batch, high in the basic ingredients, $Na_2B_4O_7.10H_2O$ and $K_2B_4O_7.4H_2O$, was boiled only enough to liberate the quantity of $CO_2$ corresponding with the requirements of Reaction III. Further boiling would have liberated more $CO_2$ from such hot, alkaline solutions.

I have found, if the cold mother liquor be reheated to the boiling point (before again adding more raw materials thereto) that further liberation of $CO_2$ takes place with even greater ease. I make use of this phenomenon when it is desired to reduce the combined $CO_2$ content ($KHCO_3$ content) of the cyclic mother liquor. I believe that such boiling of the mother liquor brings about a reaction between the bicarbonate in solution, and the $K_2B_{10}O_{16}.8H_2O$ in solution, as might be expressed by the equation:

(IV) $2K_2B_{10}O_{16}.8H_2O + 6KHCO_3 + H_2O =$
$$5K_2B_4O_7.4H_2O + 6CO_2$$

At any rate, I have found that if such re-boiled solutions again be cooled, seeded and agitated for 18 hours or so, a further crop of potassium tetraborate may be recovered. However, I seldom make it a practice to recover such an increment of $K_2B_4O_7.4H_2O$ separately, as the raw materials may be added to the re-boiled solution, further $CO_2$ boiled off (if desired), the borax crop removed and both the "yield" crop and the "increment" crop of $K_2B_4O_7.4H_2O$ recovered together.

Mother liquor for starting the cycle can be prepared in a number of ways. Obviously, it might be prepared by purchasing the ingredients (or their equivalents) heretofore set forth to represent the composition of said liquor. However, I prefer to make it by reacting $K_2B_{10}O_{16}.8H_2O$ and $NaHCO_3$. The reactions involved in the first preparation of a suitable mother liquor are expressed by a combination of Equation III above, and the equation:

(V) $2K_2B_{10}O_{16}.8H_2O + 10NaHCO_3 + 31H_2O =$
$$4KHCO_3 + 5Na_2B_4O_7.10H_2O + 6CO_2$$

Were sodium carbonate used in place of the bicarbonate, the reactions would be a combination of Equation II and:

(VI) $2K_2B_{10}O_{16}.8H_2O + 5Na_2CO_3 + 36H_2O =$
$$4KHCO_3 + 5Na_2B_4O_7.10H_2O + CO_2$$

In one operation conducted on a pilot plant scale, I produced about 2100 pounds of a suitable mother liquor, for starting operations containing about 14.5 per cent $CO_2$ (expressed as $KHCO_3$) in solution, in the following manner:

I first weighed out a quantity of $$K_2B_{10}O_{16}.8H_2O\text{-}NaHCO_3$$

raw material equivalent to 1470 pounds $K_2B_{10}O_{16}.8H_2O$ and 630 pounds $NaHCO_3$. This material was placed in a tank containing cold water, the water added to the tank plus that contained (as entrainment) in the raw material amounting to about 1600 pounds. I then heated the mixture to dissolve the solids. Later, I introduced an additional 230 pounds of $NaHCO_3$ (145 pounds of $Na_2CO_3$ could have been substituted), which made the total (equivalent) NaHCO₃ addition 860 pounds. Boiling for the liberation of CO₂ was continued, without appreciable loss of water, until analysis showed the hot syrupy liquor to contain about 8.4 percent by weight of remaining $CO_2$, expressed as $KHCO_3$. This represents about 135 pounds of $CO_2$ remaining in the liquor. Based upon an intake of 860 pounds of NaHCO₃, there was liberated 315 pounds of CO₂, or 70 percent of the total CO₂ contained in the reagents. Had Na₂CO₃ been substituted for NaHCO₃, entirely, the remaining CO₂ (expressed as KHCO₃) would have been the same, but the quantity of CO₂ to be liberated would have been only about 90 pounds.

The liquor was then cooled, finally to 35° C. But, due to the enormous crop of borax which would have precipitated, in a single crystallization, the cooling was conducted stepwise, over a long period. The first cooling was carried to 50° C., and a crop of borax removed; a second cooling carried the liquor to 45° C., and a further crop of borax was removed. A final cooling at 35° C. accompanied by long agitation (several days) brought out the final borax crop, which was separated from the liquor. The several crops were, of course, washed. The recovered crop contained a little more than 1500 pounds of borax. Since this liquor was just about saturated at 35° C. with respect to the $K_2B_{10}O_{16}.8H_2O$ and $K_2B_2O_7.4H_2O$, neither of these components could precipitate with the borax crop, despite long-time cooling employed. The resulting mother liquor contained about 11.24 per cent K₂O, about 3.41 per cent Na₂O and 15.24 percent B₂O₃. It also contained about 14.5 percent CO₂ when expressed as KHCO₃. It constituted a suitable mother liquor for starting a cyclic process.

The foregoing example of the preparation of a mother liquor also illustrated a principle of my invention, namely, that the addition of alkali (Na₂CO₃ or NaHCO₃) in excess of the approximate ratio of $70K_2B_{10}O_{16}.8H_2O$-$30NaHCO_3$ tends to build up the solutions with respect to CO₂, expressed throughout this specification as the KHCO₃ content. This is desired when manufacturing a mother liquor, and is permissible as a fluctuating factor over rather wide limits during the operation of the established cycle. However, overall, on the average, cycle after cycle, the quantities of raw materials added to, and removed from, the established cycle must fulfill the requirements of Equation II or Equation III—minor corrections being made for liquor losses by spillage and entrainment. The process is extremely flexible, and may be operated between wide limits of KHCO₃ contents, as well as wide limits of concentrations of the reacting raw materials. About the only limitation to the latter is the "thickness" or density of the sludge of borax produced during the cooling operations. Since all the reagents (within reasonable limits) dissolve readily at the boiling-off temperatures, there is no necessity for controlling the process at that point, save to ascertain that overall (cycle after cycle) as much CO₂ is boiled off as is required by Equation II or III.

If it is elected to employ caustic soda with potassium pentaborate, as per Equation I, the process of my invention is quite similar, though even simpler. In such instance it is unnecessary to heat the solution to the boiling point—a temperature of 50° C.–60° C. is sufficient, prior to beginning the steps of preferential crystallization, as hereinbefore described. As an example of such operation, to 3150 pounds of end liquor at 35° C., I add 500 pounds of "liquid caustic" (commercial NaOH solution) containing 48 percent NaOH. I also add the washings from a previous batch, said washings containing about 90 pounds of water. There is also added to the batch 1175 pounds of potassium pentaborate, $K_2B_{10}O_{16}.8H_2O$, which dissolves completely at about 50° C. in the presence of said caustic soda. I then proceed to cool the solution to 35° C. with mild agitation, over a period of two or three hours, thereby precipitating a crop of borax, which upon removal by centrifuging weighs about 1145 pounds, and is essentially pure, i. e., free of solid-phase contamination with any other salt, save a small amount, less than 1 percent, of potassium tetraborate.

According to the principles set forth in the foregoing exposition, the liquor from which the borax has been crystallized, is still highly supersaturated with respect to $K_2B_4O_7.4H_2O$. Accordingly, I proceed to crystallize said potassium tetraborate, at the same 35° C. temperature, by the addition of some $K_2B_4O_7.4H_2O$ seed crystals, and the application of agitation for a period of 18 hours or so. About 610 pounds of $K_2B_4O_7.4H_2O$ as a commercially pure product may be recovered by centrifuging the resulting sludge. This, upon washing and drying to remove the adhering water may be marketed as such or recrystallized to remove the one or two percent of contaminating borax. The end liquor may be returned for the further processing of potassium pentaborate with caustic soda. The end liquors usually contain from 3 to to 5 percent, by weight of $K_2B_4O_7.4H_2O$ and of $Na_2B_4O_7.10H_2O$ more than would be expected from equilibrium solubility determinations. The end liquor produced in the above example contained 7.94 percent K₂O, 2.10 percent Na₂O and 16.10 percent B₂O₃—the remainder being essentially water.

As in the examples wherein sodium carbonate or bicarbonate were used for reaction with the potassium pentaborate, exact proportioning of any given batch is not vitally important. The "hot" liquor may contain considerable unreacted $K_2B_{10}O_{16}.8H_2O$, so long as the concentration of said reagent does not exceed a value of about 10 percent in the cold (35° C.) end liquor.

The impurities most likely to occur with the several raw materials are sodium pentborate (or some equivalent acid sodium borate) and sodium chloride. The former reacts with the soda alkali (NaHCO₃, etc.) to yield borax, which borax is removed with the main borax crop generated by the reaction between potassium pentaborate and the soda alkali. Also it can react with KHCO₃ to give $K_2B_{10}O_{16}$ and NaHCO₃—obviously desirable products. Hence, save for the possible consumption of alkali, such impurity is of little consequence. The presence of NaCl is however, undesirable, as it reacts with the generated $$K_2B_4O_7.4H_2O$$

to give borax and KCl. Borax so produced is cared for in the obvious manner, but the loss of the $K_2B_4O_7.4H_2O$ is undesirable. Also accumulation of KCl in the cyclic mother liquor cannot be allowed to continue indefinitely. If the chloride content (calculated as KCl) of the cold mother liquor approaches about 20 percent, by weight, it will reach its saturation point, and, if exceeded, will precipitate with the borax crop. However, I have found that the presence of KCl, per se, is not deleterious to the system—and that considerable quantity of such compound may, to advantage, be allowed to reside in the cyclic mother liquor of the present process.

While the particular examples of the process of the present invention herein described is well adapted to carry out the objects of the process, it is to be understood that various modifications may be made, and this invention includes such modifications and changes as fall within the scope of the appended claims.

I claim:

1. A process of manufacturing potassium tetraborate tetrahydrate, which comprises heating and reacting potassium pentaborate and a sodium compound from the group consisting of hydroxide, carbonate and bicarbonate to form sodium and potassium tetraborate in solution, thereafter cooling the solution to a point sufficient to crystallize borax from the solution while the potassium tetraborate remains dissolved in the solution, removing the crystallized borax from the solution, and thereafter inducing crystallization of the potassium tetraborate to cause it to precipitate as potassium tetraborate tetrahydrate $K_2B_4O_7.4H_2O$.

2. A process of producing potassium tetraborate tetrahydrate ($K_2B_4O_7.4H_2O$), which comprises heating and reacting a mother liquor containing sodium and potassium borates and carbonates, potassium pentaborate and a sodium compound from the group consisting of hydroxide, carbonate and bicarbonate, together so as to form sodium and potassium tetraborate in solution, thereafter cooling such solution to a point sufficient to crystallize borax ($Na_2B_4O_7.10H_2O$) from the solution while the potassium tetraborate remains dissolved in the solution, separating the crystallized borax from the solution, and thereafter inducing crystallization of the potassium tetraborate to cause it to precipitate as potassium tetraborate tetrahydrate ($K_2B_4O_7.4H_2O$).

3. A process of producing potassium tetraborate tetrahydrate ($K_2B_4O_7.4H_2O$), which comprises heating and reacting a mother liquor containing sodium and potassium borates and carbonates, potassium pentaborate and a sodium compound from the group consisting of hydroxide, carbonate and bicarbonate, together so as to form sodium and potassium tetraborate in solution, thereafter cooling such solution to a point sufficient to crystallize borax ($Na_2B_4O_7.10H_2O$) from the solution while the potassium tetraborate remains dissolved in the solution, separating the crystallized borax from the solution, thereafter inducing crystallization of the potassium tetraborate to cause it to precipitate as potassium tetraborate tetrahydrate ($K_2B_4O_7.4H_2O$), and returning the remaining mother liquor to the first-mentioned operation.

4. A process of manufacturing potassium tetraborate tetrahydrate, which process comprises reacting potassium pentaborate and a sodium carbonate together in solution while heating the solution to drive off carbon dioxide, thereby forming a potassium tetraborate and sodium tetraborate in solution, thereafter cooling the solution to a point sufficient to crystallize and precipitate borax from the solution while the potassium tetraborate remains dissolved in the solution, removing the borax from the solution, and thereafter inducing crystallization of potassium tetraborate tetrahydrate.

5. A process of manufacturing potassium tetraborate tetrahydrate, which process comprises adding to the mother liquor, from a previous operation and containing carbonate, potassium pentaborate and a sodium compound from the group consisting of hydroxide, carbonate and bicarbonate, heating the same to drive off carbon dioxide while forming potassium tetraborate tetrahydrate in solution, cooling the solution to a point sufficient to first crystallize and precipitate borax only from the solution while the potassium tetraborate remains dissolved in the solution, separating the produced borax from the solution, and thereafter inducing crystallization of potassium tetraborate tetrahydrate.

6. A process of manufacturing potassium tetraborate tetrahydrate, which process comprises adding to the mother liquor containing sodium and potassium borates and carbonates, from a previous operation, potassium pentaborate and a sodium compound from the group consisting of hydroxide, carbonate and bicarbonate, heating the same to drive off carbon dioxide while forming potassium tetraborate tetrahydrate in solution, cooling the solution to a point sufficient to first crystallize and precipitate borax only from the solution while the potassium tetraborate remains dissolved in the solution, separating the produced borax from the solution, and thereafter inducing crystallization of potassium tetraborate tetrahydrate, and returning the mother liquor from said last crystallization to the first operation.

7. A process of manufacturing potassium tetraborate tetrahydrate, which process comprises adding potassium pentaborate and sodium bicarbonate to a mother liquor from a previous similar operation, heating the same to evolve carbon dioxide and form sodium and potassium tetraborate in solution, thereafter cooling the solution to a point sufficient to crystallize first borax only from the solution while the potassium tetraborate remains dissolved in the solution, separating the precipitated borax from the solution, thereafter inducing crystallization of potassium tetraborate tetrahydrate, removing the precipitate from the mother liquor, and returning the mother liquor to the first operation.

8. A process of manufacturing potassium tetraborate tetrahydrate, which comprises adding potassium pentaborate and a sodium compound from the group consisting of hydroxide, carbonate and bicarbonate, to a mother liquor containing between 7 and 18% of potassium bicarbonate, heating the same to evolve carbon dioxide from the solution and form sodium and potassium tetraborates in solution, cooling the solution to a point sufficient to first precipitate borax only while the potassium tetraborate remains dissolved in the solution, removing the borax from the solution, and thereafter inducing crystallization of potassium tetraborate tetrahydrate, removing such latter precipitate from the mother liquor, and returning such mother liquor to the first operation.

FRANK HENDERSON MAY.

REFERENCES CITED

The following references are of record in the file of this patent:

UNITED STATES PATENTS

| Number | Name | Date |
|---|---|---|
| 1,468,366 | Kelly | Sept. 18, 1923 |
| 1,961,073 | Newman | May 29, 1934 |
| 2,105,109 | Dolley | Jan. 11, 1938 |
| 2,331,965 | Dreyfus | Oct. 19, 1943 |